United States Patent [19]

Takeuchi et al.

[11] Patent Number: 5,233,603
[45] Date of Patent: Aug. 3, 1993

[54] PACKET SWITCH SUITABLE FOR INTEGRATED CIRCUIT IMPLEMENTATION

[75] Inventors: Takao Takeuchi; Hiroshi Suzuki; Susumu Iwasaki; Hiroshi Nagano; Toshio Suzuki, all of Tokyo, Japan

[73] Assignee: NEC Corporation, Tokyo, Japan

[21] Appl. No.: 771,865

[22] Filed: Oct. 8, 1991

Related U.S. Application Data

[63] Continuation of Ser. No. 342,401, Apr. 21, 1989, abandoned.

[30] Foreign Application Priority Data

Apr. 21, 1988 [JP] Japan .................... 63-99938
Aug. 31, 1988 [JP] Japan .................... 63-219364

[51] Int. Cl.5 .................................... H04L 12/56
[52] U.S. Cl. ............................ 370/60; 370/94.1
[58] Field of Search ............. 370/58.1, 58.2, 58.3, 370/60, 60.1, 61, 94.1

[56] References Cited

U.S. PATENT DOCUMENTS

| | | | |
|---|---|---|---|
| 4,603,416 | 7/1986 | Servel et al. ................ | 370/94.1 |
| 4,630,258 | 12/1986 | McMillen et al. ............ | 370/94.1 |
| 4,780,870 | 10/1988 | McHarg et al. .............. | 370/60 |
| 4,837,761 | 6/1989 | Isono et al. .................. | 370/60 |
| 4,864,558 | 9/1989 | Imagawa et al. ............. | 370/60 |
| 4,864,560 | 9/1989 | Quinquis et al. ............. | 370/94.1 |
| 4,884,264 | 11/1989 | Servel et al. ................ | 370/60 |
| 4,905,225 | 2/1990 | Francois et al. ............. | 370/60 |
| 4,933,932 | 6/1990 | Quinquis et al. ............. | 370/60 |

FOREIGN PATENT DOCUMENTS 0257816 7/1987 European Pat. Off. .
WO87/04579 1/1987 PCT Int'l Appl. .

OTHER PUBLICATIONS

A. Thomas et al., "Asynchronous Time-Division Techniques: an Experimental Packet Network Integrating Videocommunication", ISS '84, Florence, May 7-11, 1984, Session 32 C Paper 2, pp. 1, 3, 5, and 7.
CMOS Data Book, "Cypress Semiconductor", Cypress Semiconductor Corporation, 1988, pp. 5-48 through 5-54.

Primary Examiner—Douglas W. Olms
Assistant Examiner—Alpus H. Hsu
Attorney, Agent, or Firm—Foley & Lardner

[57] ABSTRACT

A packet switch for high-speed synchronous multiplexing of voice and picture communications collectively. The packet switch uses among other things an input multiplexer, and output demultiplexer, and a single buffer memory divided into memory areas connected to multiple input and output lines. The subdivided buffer is controlled by counters rather than a more complicated address exchanger. A second embodiment eliminates the need for an output demultiplexer because of individual read/write control of the buffer units. A third embodiment includes a bidirectional bus between an input buffer and an output buffer. A fourth embodiment uses a more economical unidirectional bus. The unidirectional bus can be limited to a part of an input packet to permit Large Scale Integration (LSI). In the LSI configuration, address filters may be replaced with a centralized address controller, and the buffer can consist of FiFo memory units or RAM units.

2 Claims, 11 Drawing Sheets

PACKET SWITCH SUITABLE FOR INTEGRATED CIRCUIT IMPLEMENTATION

This application is a continuation of application Ser. No. 07/342,401, filed Apr. 21, 1989, now abandoned.

BACKGROUND OF THE INVENTION

The present invention relates to a packet switch for high-speed packet communications.

In parallel with the rapid progress in the optical fiber transmission and high-speed VLSI (Very Large Scale Integrated Circuit) technologies, there is an increasing demand for new communication services of the kind using extremely fine pictures, for example. While broadband ISDN's (Integrated Services Digital Networks) are available as means for handling a plurality of different kinds of information such as voice and pictures collectively, how to multiplex and switch such various kinds of information is a critical consideration. A STM (Synchronous Transfer Mode) switching scheme and a ATM (Asynchronous Transfer Mode) switching scheme have been proposed to implement the multiplexing and switching system of broadband ISDN's.

With an ATM switching scheme, motion picture, voice or similar continuous data and a still picture or similar burst data are packetized into fixed length packets and the packets are exchanged. The ATM switching scheme does not require that the terminal equipment and transmission channels be synchronous and be provided with the same data rate. This kind of switching scheme is therefore advantageous over an STM switching scheme with regard to the ease of system expansion and development. An example of packet switches applicable to an ATM switching scheme has been taught by Thomas et al in a paper entitled "ASYNCHRONOUS TIME-DIVISION TECHNIQUES: AN EXPERIMENTAL PACKET NETWORK INTEGRATING VIDEO COMMUNICATION", International Switching Symposium, (ISS) '84 Florence, May 7-11, 1984, Session 32 C, Paper 2 (Reference 1). As described later in detail, the packet switch disclosed in this paper has a single buffer memory which is shared by multiple input lines and multiple output lines, and it switches packets by controlling the write and read addresses of the buffer memory. The address control of the buffer memory is effected by using address queues which are assigned to individual output lines, a waiting address queue which shows addresses of stored packets, an idle address queue which shows idle areas of the memory, etc. While this system can be implemented with a relatively small buffer memory capacity because multiple output lines share the memory, it requires complicated control for the shared use of the memory. Specifically, idle address queue and waiting address queues associated with the individual output lines are required, and addresses have to be interchanged between the idle address queue and the waiting address queues every time a packet is written in or read out of the buffer memory. Moreover, when a certain address in a queue is lost or doubled by noise or some malfunction, there occurs in the buffer memory an unused area or, in the worst case, false data is overwritten on a packet to delete the latter or a packet is fed out to an unexpected output line. Such occurrences cannot be eliminated without resorting to extra means for detecting unusual conditions and, because such detection is difficult, the processing is complicated.

SUMMARY OF THE INVENTION

It is therefore an object of the present invention to provide a packet switch which is easy to control and highly reliable.

It is another object of the present invention to provide a packet switch configuration which can be readily implemented as an integrated circuit.

The present invention is a packet switch for exchanging packets received over input lines and outputting the exchanged packets to a plurality of output lines, comprising: a multiplexer for time-division multiplexing the into packets received over input lines multiplexed packets, an address detecting unit for detecting an address of each packet in the multiplexed packets to produce a destination address, a write address generating unit responsive to the destination address for generating a write address, a read address generating unit for sequentially generating read addresses, a memory unit which includes memory areas individually associated with the output lines, the memory unit responsive to the write address for storing each packet of the multiplexed packets in any of the memory areas, and responsive to the read addresses for producing exchanged multiplexed packets by reading the stored packets, and a demultiplexing unit for demultiplexing exchanged multiplexed packets into exchanged packets and delivering them to the output lines.

BRIEF DESCRIPTION OF THE DRAWINGS

The above and other objects, features and advantages of the present invention will become more apparent from the following detailed description taken with the accompanying drawings in which.

In the figures, the same components and structural elements are designated by like reference numerals.

DETAILED DESCRIPTION OF THE PREFERRED EMBODIMENTS

Figure 1:
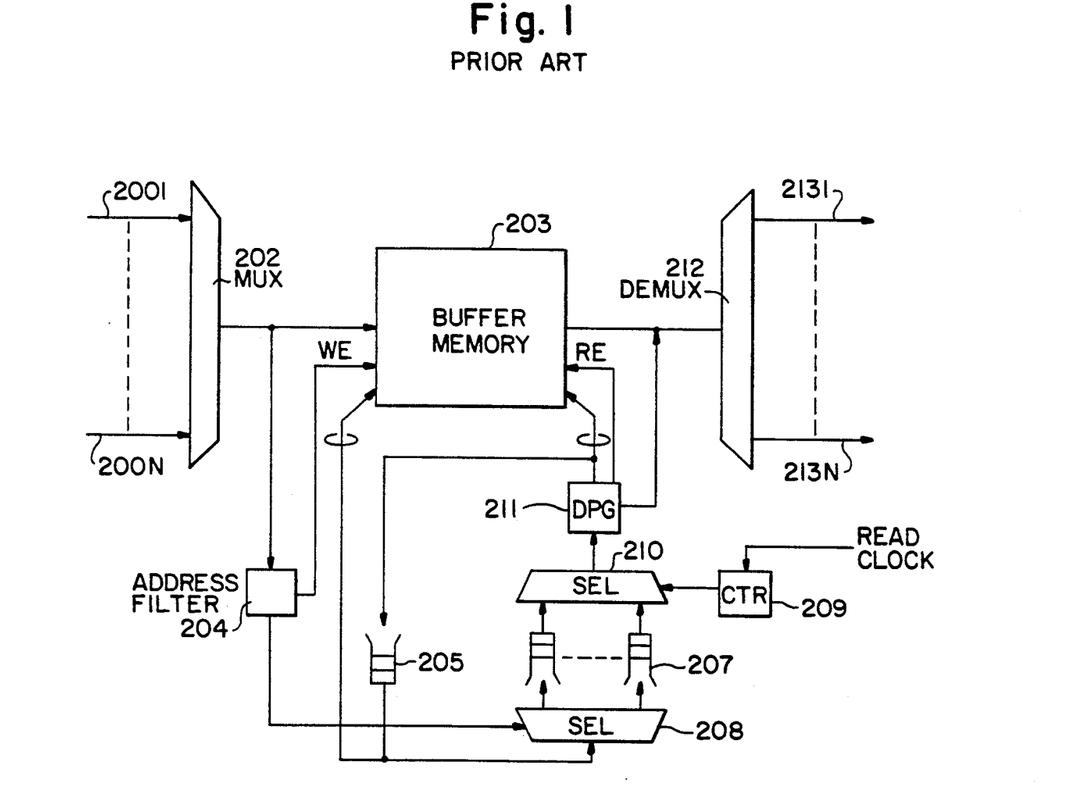
FIG. 1 is a schematic block diagram showing a prior art packet switch.

To better understand the present invention, a brief reference will be made to a specific construction of the previously mentioned packet switch proposed by Thomas et al., shown in FIG. 1. In this figure, various kinds of data each having a predetermined packet configuration of a fixed length come in over a plurality of input lines 2001 to 200N. A multiplexer 202 receives all of the packets coming in over the input lines 2001 to 200N and multiplexes them on a packet basis. Assuming that the bit rate of each input line is V (bit/s) and that the number of input lines is N, the bit rate of the multiplexed packet is VN (bit/s). The multiplexed packet outputted by the multiplexer 202 is fed to a buffer memory 203 and an address filter 204. In response, the address filter 204 extracts output line information (an output line address) associated with the arrived packet and applies it to a selector 208, while delivering a write enable signal WE to the buffer memory 203. A write address queue 205 storing the addresses of unoccupied or empty areas of the buffer memory 203 feeds to the buffer memory 203 and the selector 208 a write address. The buffer 203 stores the packet in response to the write address and the write enable signal WE. Connected to the selector 208 are read address queues 207 which are associated with individual output lines 213 and may each be implemented by a First-in First-out (FiFo) memory. The selector 208 delivers the write address from the write address queue 205 to one of the read address queues 207 which is associated with the output line address fed from the address filter 204.

Implemented as a dual port memory, for example, the buffer memory 203 is constructed such that packets are read out independently of packet writing in response to a read clock which is fed from the output line side. A counter 209 counts the read clock and cyclically produces the output line address.

A selector 210 is responsive to the output of the counter 209 to select any one of the read address queues 207. When any of the address queues 207 selected by the selector 210 does not store any addresses to be read, it produces a special address (dummy address). For the dummy address, use may be made of any numerical value which is never used for the addresses of the buffer memory 203 by way of example.

A dummy packet generator 211 receives the read address of the buffer memory 203 via the selector 210 and determines whether it is a dummy address or not. If the read address is a dummy address, the dummy packet generator 211 does not read a packet out of the buffer memory 203 but, instead, delivers a dummy packet which is used for timing extraction and synchronization of the system, to a demultiplexer 212. If the read address is not a dummy address, the dummy packet generator 211 applies the value of the read address to the buffer memory 203 together with a read enable signal RE so as to read out a packet. The address from which the packet has been read and is therefore empty is written into the write address queue 205. The demultiplexer 212 demultiplexes the packets from the buffer memory 203 or the dummy packet generator 211 into the output lines 2131 to 213N. The procedure described above is repeated to execute packet switching. This prior art packet switch has a single buffer memory which is shared by a plurality of output lines and is therefore successful in reducing the required capacity of a buffer memory, it renders the address control complicated, as discussed earlier.

Figure 2:
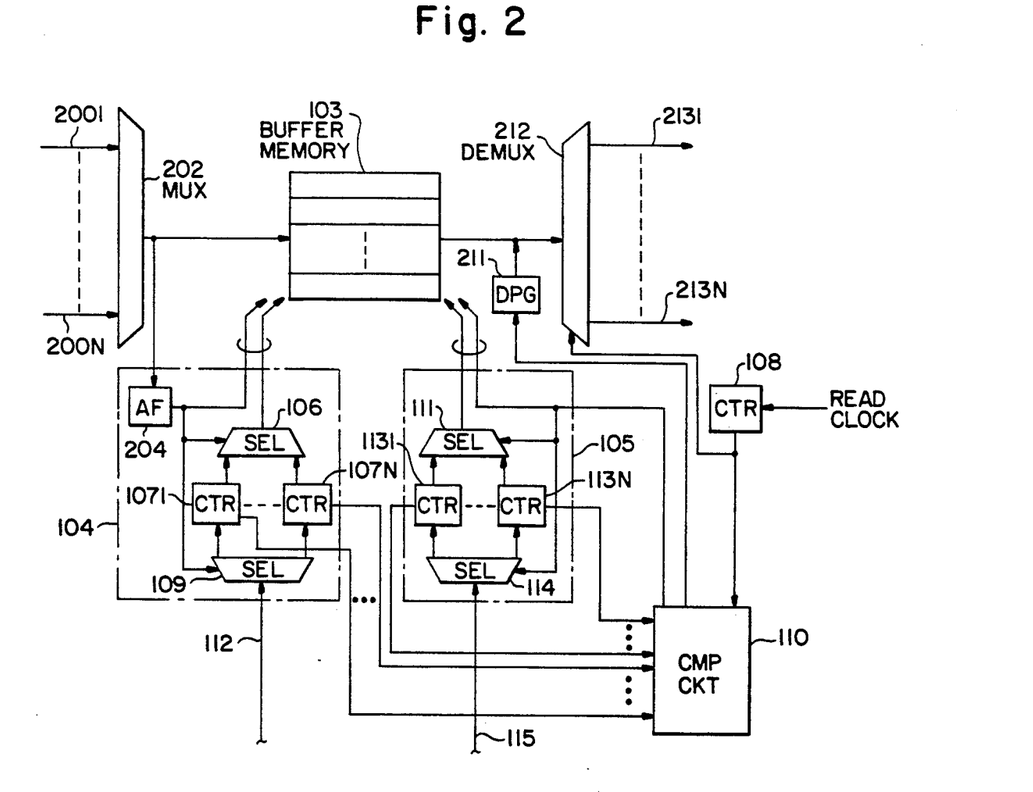
FIG. 2 is a schematic block diagram showing a first embodiment of the present invention.

Referring to FIG. 2, a first embodiment of the packet switch in accordance with the present invention is shown. In the figure, fixed length packets arrive at input lines 2001 to 200N on a time division basis. A multiplexer 202 multiplexes those packets on a time division basis and delivers the multiplexed packets to a buffer memory 103 and a write address controller 104. The buffer memory 103 is divided into N memory areas each being associated with a different output line of N output lines 2131~213N. These memory areas may have the same size and may be provided with addresses in the same manner, for example. The write address controller 104 includes an address filter 204 for extracting from the input packet the destination address which is associated with the destined output line. More specifically, the address filter 204 determines to which output line the input packet should be directed and, for example, produces an output line number indicating the particular output line. The output line number is delivered to the buffer memory 103 and a selector 106. Connected to the input of the selector 106 are write address counters or write address pointers 1071 to 107N associated with the individual output lines 2131 to 213N, and each generates a write address of the associated memory area of the buffer memory 103. In response to the output line number from the address filter 204, the selector 106 selectively feeds to the buffer memory 103 a value of the associated counter as a write address. Hence, the packet is written in a particular address of a particular area as designated by the write address from the selector 106 and the output line number from the address filter 204. The output line number from the address filter 204 is also fed to a selector 109. In response, the selector 109 selectively feeds an externally derived increment clock 112 to the counters 1071 to 107N to increment the contents of the counters.

On the other hand, packet reading is performed independently of the packet writing in response to a read clock which is fed from the output line side. A counter 108 counts the incoming read clock and sends its output to a comparing circuit 110. A read address controller 105 comprises two selectors 111 and 114, and read address counters 1131 to 113N. The comparing circuit 110 compares the write addresses of the counters 1071 to 107N and the read addresses of the counters 1131 to 113N in response to the value of the counter 108. When the value of one of the read address counters 1131 to 113N and that of the corresponding one of the write address counters 1071 to 107N are the same, a packet to be read out does not exist in the memory area associated with the output line as designated by the counter 108. In this case, the comparing circuit 110 commands a dummy packet generator 211 to generate a dummy packet. Meanwhile, when the values of the read and write counters are not the same, the comparing circuit 110 delivers the value of the counter 108 to the buffer memory 103 and selectors 111, 114. The selector 111 selects any one of the counters 1131 to 113N which is indicated with the value of the counter 108. Hence, a packet is read out of a particular address of a particular memory area of the buffer memory 103 as designated respectively by the value of particular one of the counters 1131 to 113N and the value of the counter 108.

The packets read out of the buffer memory 103 or the dummy packets are fed to a demultiplexer 212. The demultiplexer 212 demultiplexes the packets into an individual packet, which is supplied to the output line indicated by the value of the counter 108. The selector 114, in response to the output of the counter 108, selectively supplies an increment clock pulse to the counters 1131 to 113N to increment their contents.

In the illustrative embodiment, adjustment is of course made such that the packet read clock and the operation clock of the demultiplexer 212 are coincident, and such that the area for reading out a packet and the output line to which the demultiplexer 212 distributes the packet accurately correspond to each other.

Packet switching is accomplished by the packet writing and packet reading described above.

An advantage attainable with this embodiment is that since the buffer memory 103 is divided into a plurality of memory areas each being associated with a different output line, the addresses of the individual areas can be controlled by counters without a complicated address exchange which is required in the prior art.

Figure 3:
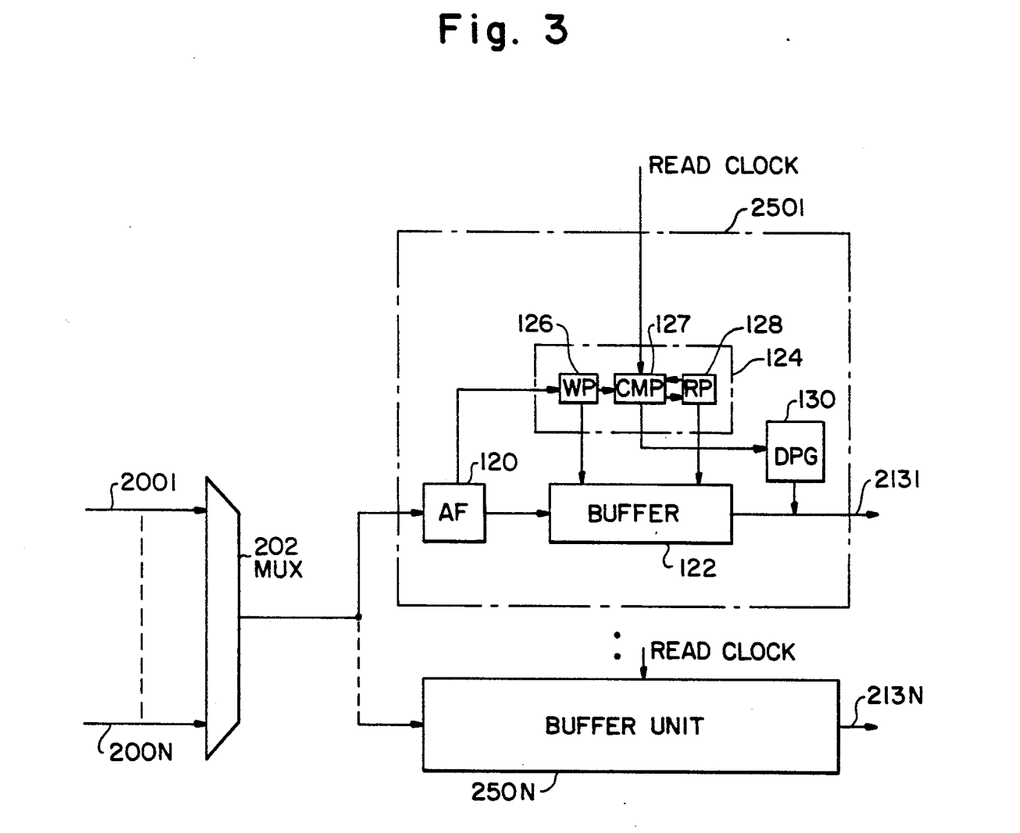
FIG. 3 is a schematic block diagram showing a second embodiment of the present invention.

Referring to FIG. 3, a second embodiment of the present invention is shown which assigns independent buffer memories to the individual output lines and performs address control line by line. In this figure, packets coming in over a plurality of input lines 2001 to 200N are multiplexed by the multiplexer 202 by the same procedure as in the first embodiment of FIG. 2. The multiplexed packet is fed to buffer units 2501 to 250N each being individually assigned to a different output line. Each buffer unit has an address filter 120, an address controller 124, a buffer memory 122, and a dummy packet generator 130. The address filter 120 detects the destination address from the packet and sends the packet to the buffer memory 122 when the detected address represents the address of the unit 2501 itself. The address filter 120 also delivers a write enable signal to the address controller 124 upon the detection of the destination address of the unit 2501. The address controller 124 has a write address counter or pointer 126, a read address counter or pointer 128 and comparator 127. In response to the write enable signal from the address filter 120, the write address counter 126 delivers the write address to the buffer memory 122 having a FiFo configuration, and then increments the write address counter 126 by 1.

On the other hand, packets are read out of the buffer memories 122 on the output line 2131 in response to, for example, a read clock which is generated by a clock pulse generator, not shown. The comparator 127 of the address controller 124 compares the read address of the counter 128 and the write address of the counter 126 upon reception of the read clock pulse.

If the both read and write addresses are different with each other, the comparator 127 feeds a read control signal to the read address counter 128. In response to the read control signal, the read address counter 128 supplies the read address to the buffer memory 122 together with a read enable signal and increments its own value by one. If the read address from the counter 128 is identical with the write address from the counter 126, the comparator 127 delivers a dummy packet insertion command to the dummy packet generator 130. In response, the dummy packet generator 130 generates a dummy packet having a predetermined format and, in synchronism with the read-out of a packet from the buffer memory 122, delivers the dummy packet to the output line 2131. The format of the dummy packet is dependent upon the protocol of data transmission. This particular embodiment of FIG. 3 eliminates the need for a demultiplexer because the buffer unit having the address filter 120, the address controller 124 and the dummy packet generator 130 are assigned to each of the output lines 2131 to 213N.

Figure 4:
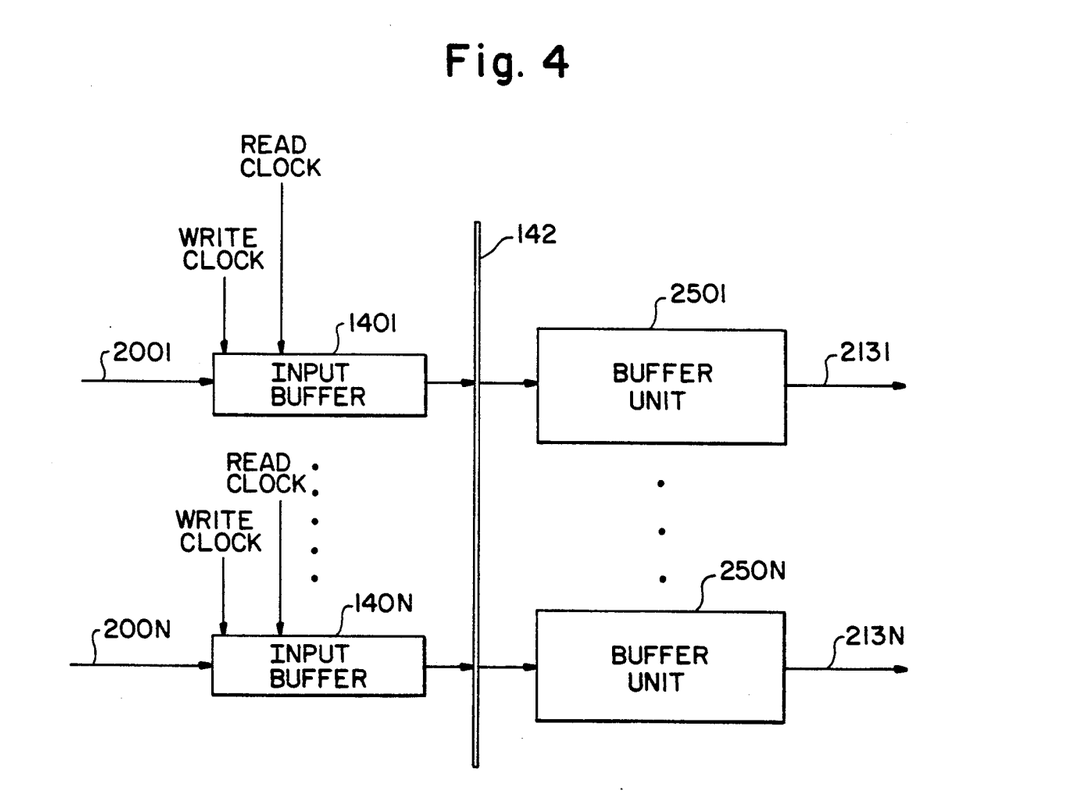
FIG. 4 is a schematic block diagram showing a third embodiment of the present invention.

FIG. 4 shows a third embodiment of the present invention using input buffers 1401 to 140N which are individually assigned to the respective input lines 2001 to 200N. The input buffers 1401 to 140N and the buffer units 2501 to 250N which are provided on the output lines 2131 to 213N are interconnected by a bidirectional bus 142. The input buffers 1401 to 140N and bus 142 co-operate as the multiplexer 202 shown in FIG. 3. Each of the input buffers 1401 to 140N temporarily stores a packet coming in over its associated input line in response to a write clock whose frequency is the same as the transmission speed of the incoming packet. The input buffers 1401 to 140N also receive a read clock which cyclically supplied from an external clock pulse generator. In response to the read clock, the input buffers 1401 to 140N sequentially deliver the stored packet to the bus 142 on a time division basis so that a multiplexed packet is on the bus 142.

The packet on the bus 142 is fed to all of the buffer units 2501 to 250N. This is followed by the same procedure as in the embodiment of FIG. 3.

Figure 5:
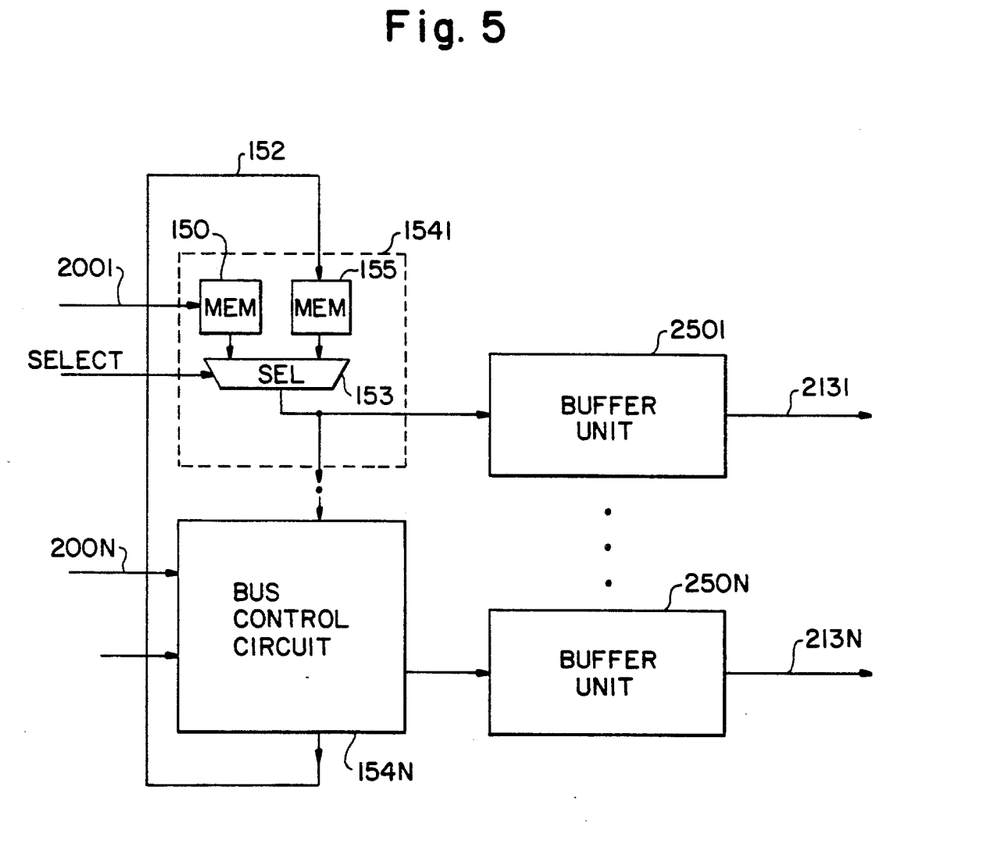
FIG. 5 is a schematic block diagram showing a fourth embodiment of the present invention.

FIG. 5 shows a fourth embodiment of the present invention in which the bus is formed in a loop configuration.

In the embodiment shown in FIG. 4, a bidirectional bus is used for the bus 142 since the direction of the data transmission depends on the position of input buffers along the bus 142. For example, in FIG. 4, the direction of the packet which the input buffer 1401 transmits to the buffer unit 250N is different from the direction of the packet which the input buffer 140N transmits to the buffer unit 2501. The loop configuration allows a unidirectional bus which is economical compared with a bidirectional bus.

In FIG. 5, each of the buffer units 2501 to 250N is assigned to each of the output lines 2131 to 213N similarly with the embodiment shown in FIGS. 3 and 4.

A characteristic feature of this particular embodiment is that each of bus control circuits 1541 to 154N for sending data to a unidirectional bus 152 is associated with each of the input lines 2001 to 200N. As shown, each of the bus control circuits 1541 to 154N comprises a first memory 150 for temporarily storing a packet fed over associated one of the input lines 2001 to 200N, a second memory 155 for temporarily storing a packet from the unidirectional bus 152, and a selector 153 for routing either one of the packets stored by the first and second memories 150 and 155 to the unidirectional bus 152 in response to an external selecting signal which is fed thereto.

The selector 153 selects data from the first memory 150 and sends it to the unidirectional bus 152 when it receives the selecting signal indicative of the data transmission timing of its associated input line, whereas, it feeds data from the second memory 155 with no selecting signal. For example, assuming that the number of the input lines is N and the speed of the operation clock of the selector 153 is U, the selector 153 receives the selecting signal in a U/N period, which has a phase difference of 1/N for the selecting signal supplied to the adjacent selector.

By such an operation of the selector 153, packets coming in over the respective input lines are sequentially fed out to the unidirectional bus 152. The unidirectional bus 152 extends across all of the bus control circuits 1541 to 154N, so that packets on the unidirectional bus 152 are routed to all of the buffer units 2501 to 250N. The following operation is the same as the operation previously discussed in relation to the second and third embodiments shown in FIGS. 3 and 4.

Now, the integrated circuit implementation for the previously discussed packet switch will be considered. Among the four different embodiments shown and described, the embodiments shown in FIGS. 3 to 5 individually have common circuits which are provided in one to one correspondence with respect to the input and output lines, compared to the embodiment shown in FIG. 2. Such a configuration, however, is not satisfactory in an the integrated circuit for the following reasons. Since the all of the common circuits are connected to the bus, large scale integration of the common circuits results in the need for bus input and output pins the number of which is twice as great as the width of the bus. An increase in the bus width would bring about a pin neck problem. Further, since all the input lines are connected to the bus, assuming that the number of the input lines is N, an operation speed N times higher than the transmission speed of each input line is required. In this respect, too, causing the bus to connect all of LSI's is not desirable. To solve this problem, it is necessary that the bus be confined in the LSI. Considering the fact that the construction shown in FIG. 5 is impracticable for large scale integration since the bus extends across the common circuits, it is realistic to use the construction shown in FIG. 3 or 4. While the construction of FIGS. 3 and 4 are not noticeably different from each other with respect to their operations principle, it will be seen that the FIG. 4 construction has more common portions than the FIG. 3 construction so long as the channel-by-channel circuit arrangement is concerned. The following description will therefore concentrate on the large scale integration of an packet switch which is implemented by the configuration of FIG. 4.

Figure 6:
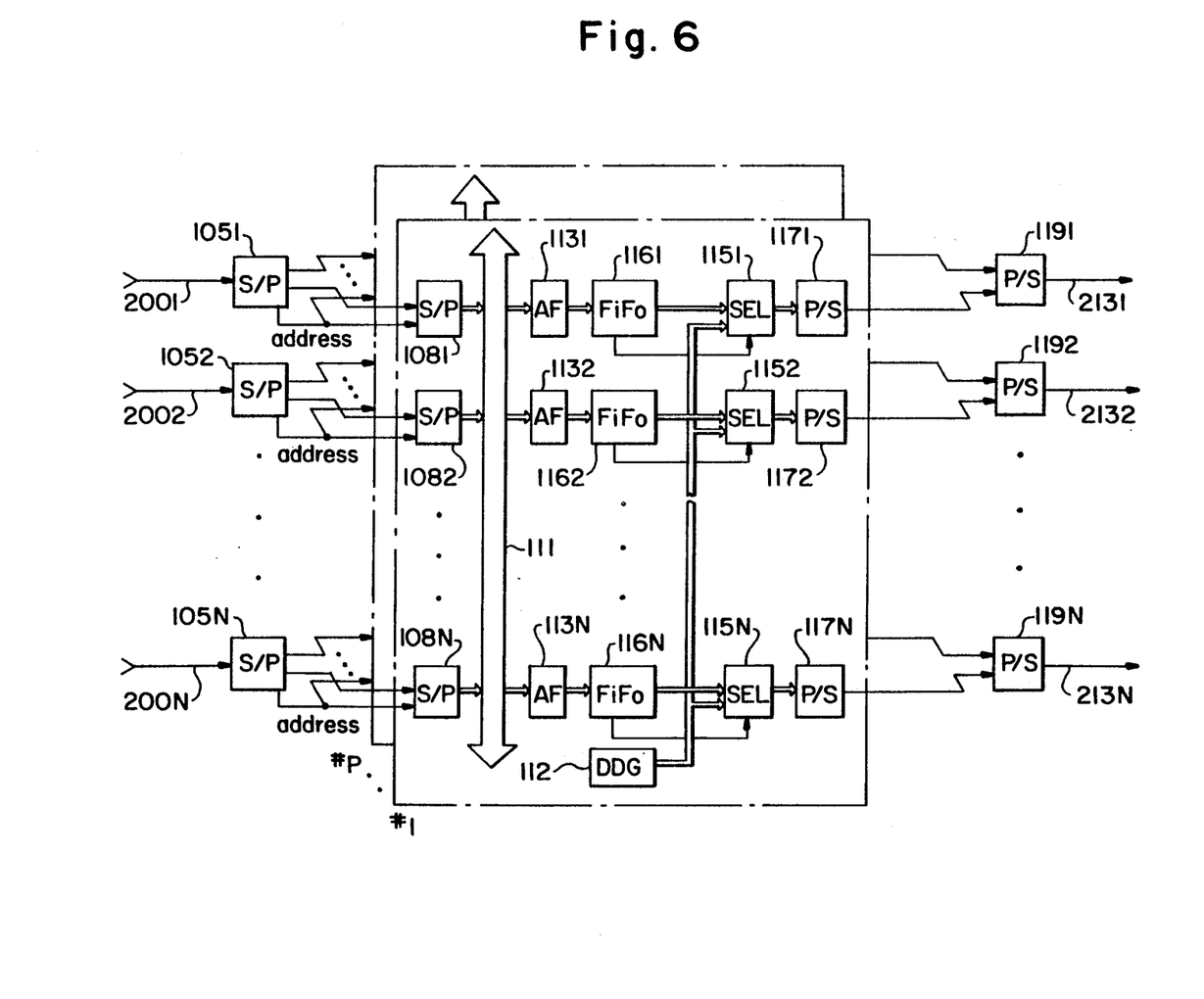
FIG. 6 is a schematic block diagram showing a specific LSI configuration of the packet switch shown in FIG. 4.

Referring to FIG. 6, a specific construction suitable for the large scale integration of the packet switch shown in FIG. 4 is shown. As shown, a plurality of unit switches each being capable of processing a part of a packet are assigned to the input and the output lines so as to confine a bus to a LSI, which has to operate at a high speed, in an LSI.

Fixed length packets coming in over a plurality (N) of input lines 2001 to 200N are serially applied to serial-to-parallel (S/P) converters 1051 to 105N. Each of the S/P converters 1051 to 105N converts the input packet to parallel data having a predetermined width (assumed to have P bits), while holding a destination address associated with an output line.

The P unit switches #1 to #P, each of which is provided in one-to-one correspondence with respect to the P bits of the parallel data, are connected to the first S/P converters 1051 to 105N. Each unit switch has the same structure and the unit switches operate in parallel to each other. Each unit switch comprises a dummy data generator 112 which generates dummy data, second S/P converters 1081 to 108N each being associated respectively with one of the input lines, address filters 1131 to 113N each being associated respective with one of the output lines (assumed to be N output lines).

Each unit switch also comprises a data bus 111 which connects the second S/P converters 1081 to 108N to the address filters 1131 to 113N, FiFo memories 1161 to 116N each being associated with a respective one of the output lines 2131 to 213N, selectors 1151 to 115N each being associated with a respective one of the output lines 2131 to 213N, and first parallel-to-serial (P/S) converters 1171 to 117N each being associated with a respective one of the output lines.

On the other hand the FiFo memories 1161 to 116N each includes a read and a write address pointers, a address comparator and a memory means like the buffer unit shown in FIG. 3. In response to a read clock from outside, the address comparator compares the pointers and determines whether the memory is empty or not. If the memory is empty, the comparator produces an empty signal, while the data are read out from the address indicated by the read address pointer if the memory has data.

The selectors 1151 to 115N each selects either data from the associated FiFo memory or dummy data from the dummy data generator 112 in response to the nature of a selecting signal. For such a FiFo memory, for example, a FiFo memory "CY7C420" described in CMOS DATA book (Reference 2) by Cypress Semiconductor Corporation, can be used. The outputs of the P unit switches #1 to #P are fed to their associated second P/S converters 1191 to 119N on an output line basis and are thereby transformed into serial data at output line speed.

The operation of the packet switch having the above construction will be described in more detail with reference to FIGS. 7a to 7c. Assume that the transmission speed of the input lines 2001 to 200N is V bit/s, the packet length is 64 bits, and eight unit switches are provided. Further, assume that all the S/P converters convert a serial input to an 8-bit output while all the P/S converters convert an 8-bit input to a serial output. By way of example, assume that a packet from the input line 2001 is coupled to the output line 2131. The explanation is directed to the operations of the unit switch #1 for simplification. Further, the selector 1151 and the dummy data generator 112 are ignored since they have no effect on the data in this particular case.

Figure 7A:
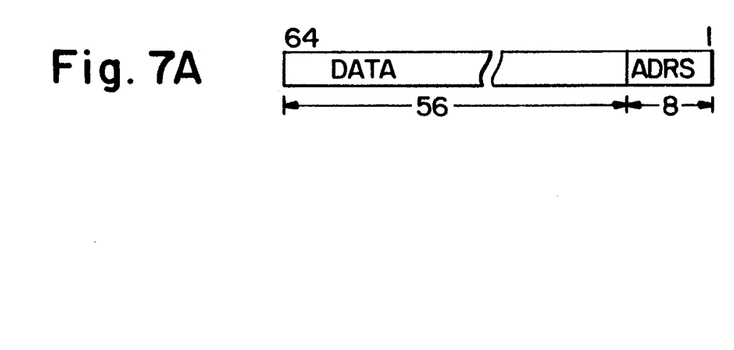
FIGS. 7a to 7c are diagrams demonstrating the operation of the packet switch shown in FIG. 6.
Figure 7B:
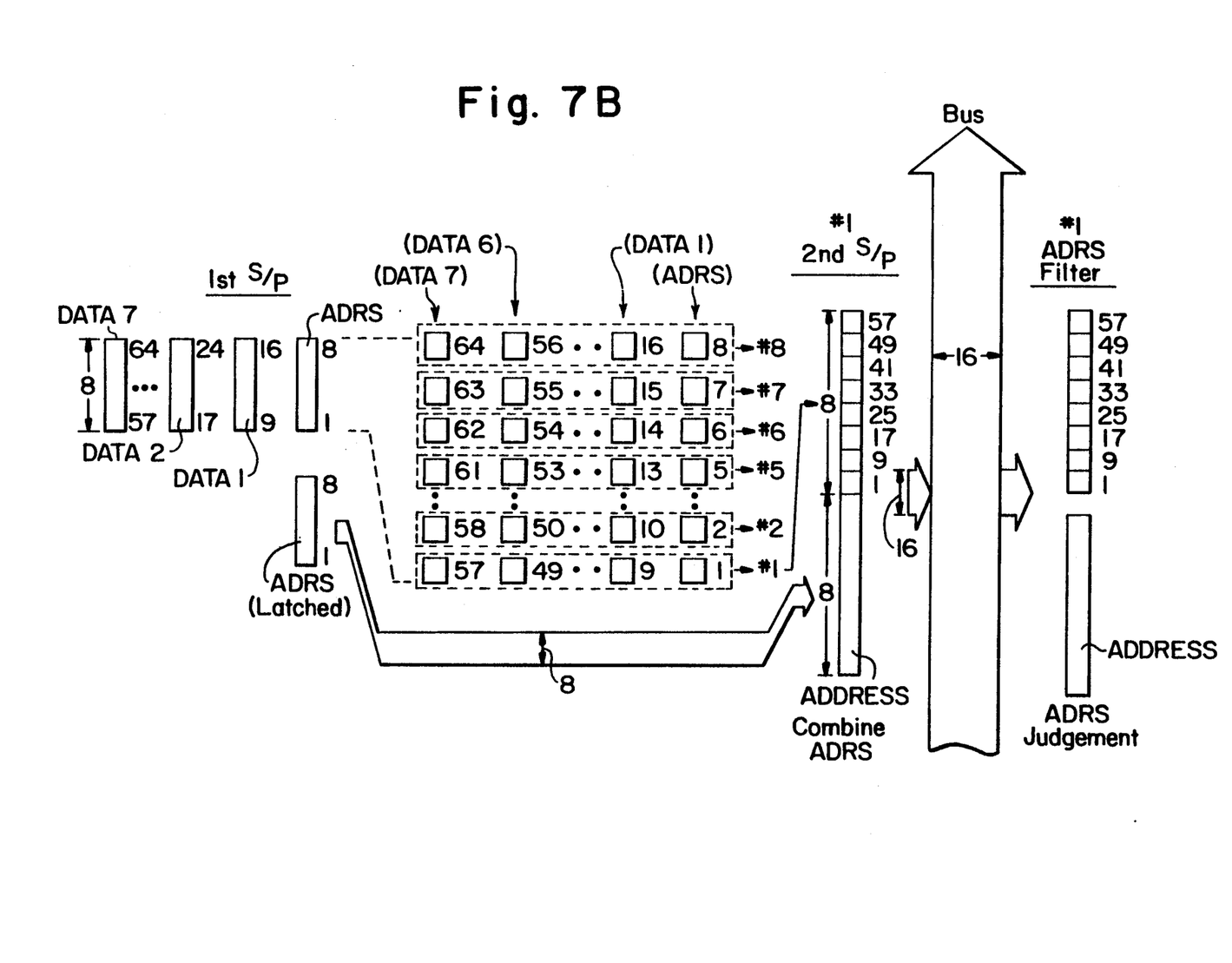
Figure 7C:
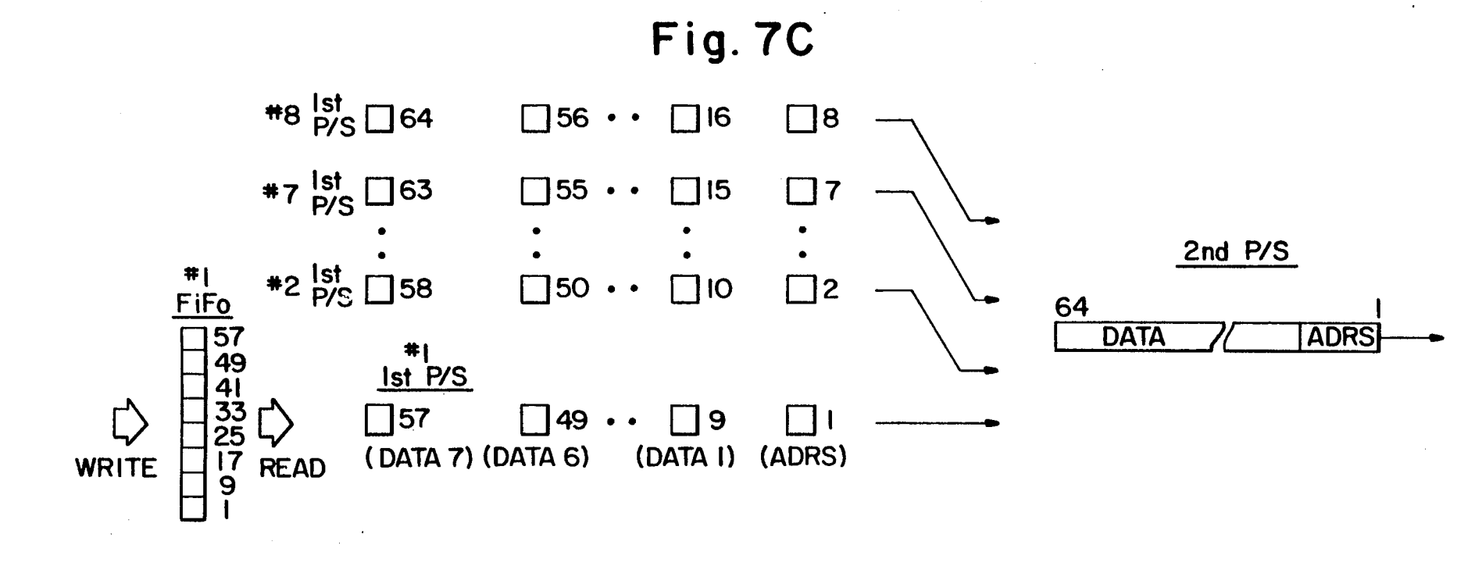

A packet having a format shown in FIG. 7a, i.e., an address field from the 1st to 8th bits and data area from the 9th to 64th arrives at the first S/P converter 1051 over the input line 2001. The S/P converter 1051 converts the packet to eight blocks DATA1 to DATA7 and ADRS each having an 8-bit width, as shown in FIG. 7b. In FIGS. 7a–7c, respective numbers 1 to 64 attached to each bit indicate the position of the bit in the packet. Having an address latching function, the first S/P converter 1051 latches only the address field of the entered packet. The S/P converter 1051 delivers the first bit of the respective data blocks to the unit switch #1. The first S/P converter 1051 also delivers the second bit of the respective data blocks to the unit switch #2. The second S/P converter 1081 converts the 8 first bits from the first S/P converter 1051 to 8-bit parallel data and adds to the parallel data the address field being latched by the first S/P converter 1051. More specifically, the S/P converter 1081 converts the leading bits (bits 1, 9, 17, . . . , 49, 57) of the eight individual data blocks to parallel data and then adds the address data to the parallel data as shown in FIG. 7b. By the second S/P converter 1081, the operation speed of the bus 111 is reduced to $\frac{1}{8}$, compared to a case without the S/P conversion of data blocks. Due to the S/P conversion by the S/P converters 1051 and 1081, data whose speed is one-sixty-fourth ($=\frac{1}{8}^2$) of V bit/s appear on the outputs of the N second S/P converters 1081 to 108N of the unit switches. The S/P converters 1081 to 108N feed the parallel 16-bit data including the address field to the bus 111 in response to read clock pulses that are sequentially fed from the outside. These read clock pulses have a bit rate of V/64×N, and each is different in phase by V/64 from the nearby read clock pulses. As a result, a time-divided signal appears on the bus 111.

The address filters 1131 to 113N are provided on the individual output lines 2131 to 213N. The data appearing on the bus 111 are applied to all of the address filters 1131 to 113N. When any of the address filters 1131 to 113N determines that the address is meant for it by referencing the address field of the input data, it writes eight bits of data which follow the address in the associated one of the FiFo's 1161 to 116N by supplying a write enable signal with the data (FIG. 7c). The data written in the FiFo's 1161 to 116N are read out at the same time on all of the channels in response to a read clock which has a bit rate of VN/64 and is fed from a clock pulse source, not shown. As shown in FIG. 7c, the 8-bit data read out of any of the FiFo's 1161 to 116N are converted to V/8 bit/s serial data by the associated first P/S converter and then fed out of the unit switches #1 to #8. Eight sequences of serial data in total from the respective unit switches, which forms parallel data, are transformed into V bit/s serial data by the second P/S converter 1191 and then applied to the output line 2131.

On the other hand, when the read clock pulse is supplied to the one of the FiFo memories 1161 to 116N, which has no data to be read out, the FiFo memory supplies an empty indicating signal as a selecting signal to the associated selector. In response, the selector selects the dummy data from the dummy data generator 112, which form the dummy packet when it is outputted forms the associated output line through the associated first and second P/S converters. For example, the dummy data generator 112 delivers to the unit switch #1 the eight bits (1st, 9th, 17th, ... , 49th, 57th) of the dummy packet, and similarly delivers to the unit switch #8 the eight bits (8th, 16th, 24th, ... , 56th, 64th) of the dummy packet.

By using a plurality of unit switches which operate in parallel as discussed above, it is possible to confine a bus to within the unit switch and therefore to promote large scale integration. The number of unit switches is readily variable to implement any desired switch scale.

In FIG. 6, each unit switch is provided with address filters 1131 to 113N in association with the output lines. However, considering the fact that each unit switch processes part of a packet which is assigned thereto, if the j-th ($1 \leq j \leq N$) address filter 113j of a certain unit switch writes data in the FiFo 116j, all the other filters 116j of other unit switches will perform the same operation as the unit switch at the same time. Hence, the sharing of one address filter with the associated FiFo memories of unit switches permits the reduction of address filters noticeably.

Figure 8:
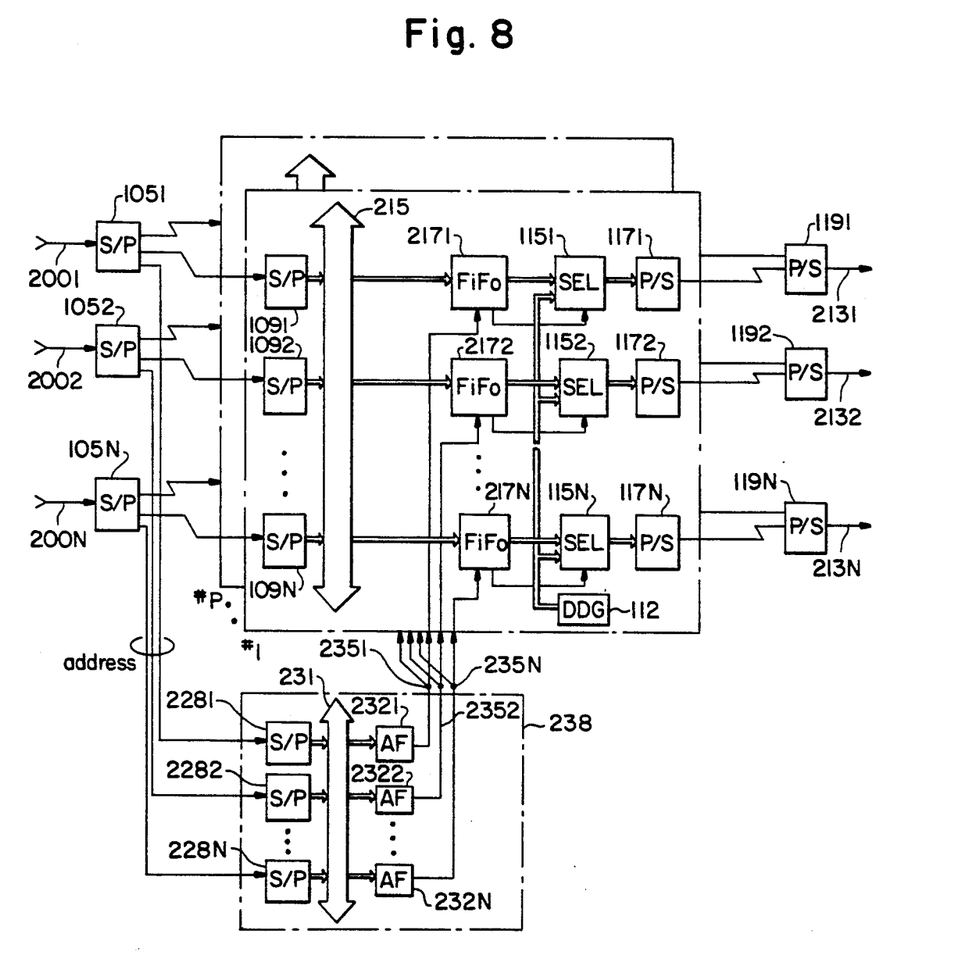
FIG. 8 is a schematic block diagram showing a first modification of the construction shown in FIG. 6.

FIG. 8 shows a specific construction for implementing such an alternative scheme.

In FIG. 8, all the address filters of the unit switches are omitted and, instead, a centralized address controller 238 is provided. Each parallel address field of a packet latched by each of the S/P converters 1051 to 105N is fed to the address controller 238 in the form of serial data. The address controller 238 comprises S/P converters 2281 to 228N individually associated with the input lines and an address bus 231 which interconnects the address filters 2321 to 232N.

The address filters 2321 to 232N are associated with a respective one of the groups of the FiFo memories which are associated with the same output line in each unit switch. For example, the address filter 2321 is associated with the FiFo memories 2171 in the unit switches #1 to #N. Address fields are converted by the S/P converters 2281 to 228N to parallel data and are latched until read out. On the other hand, the S/P converters 1091 to 109N in the unit switch convert input bits to parallel data.

While the construction of FIG. 6 is incapable of making effective use of the bus because address fields are added to the converted parallel data in the S/P converters 1091 to 109N, the alternative construction shown in FIG. 8 assigns an exclusive bus 215 to data and therefore promotes high-speed processing.

A read clock pulse is sequentially fed from the outside to the S/P converters 1091 to 109N and 2281 to 228N on a channel-by-channel basis. In the address controller 238, the address filters 2321 to 232N individually take in the address fields which are produced on the address bus 231. If any of the address filters 2321 to 232N determines that the input address is meant for it, it feeds a write enable signal to the FiFo's which constitute the associated FiFo group of the unit switches. In each unit switch, the S/P converters 1091 to 109N deliver data to the data bus 215 in response to the read clock pulse and, hence, the FiFo's 2171 to 217N write-enabled take in data from the data bus 215. The operations of the dummy data generator 112, selectors 1151 to 115N and P/S converters 1171 to 117N and the manner of outputting from each unit switch are the same as in the construction of FIG. 6.

The centralized address control discussed above is successful in eliminating the need for address filters for unit switches and in facilitating the synchronization among unit switches.

Figure 9:
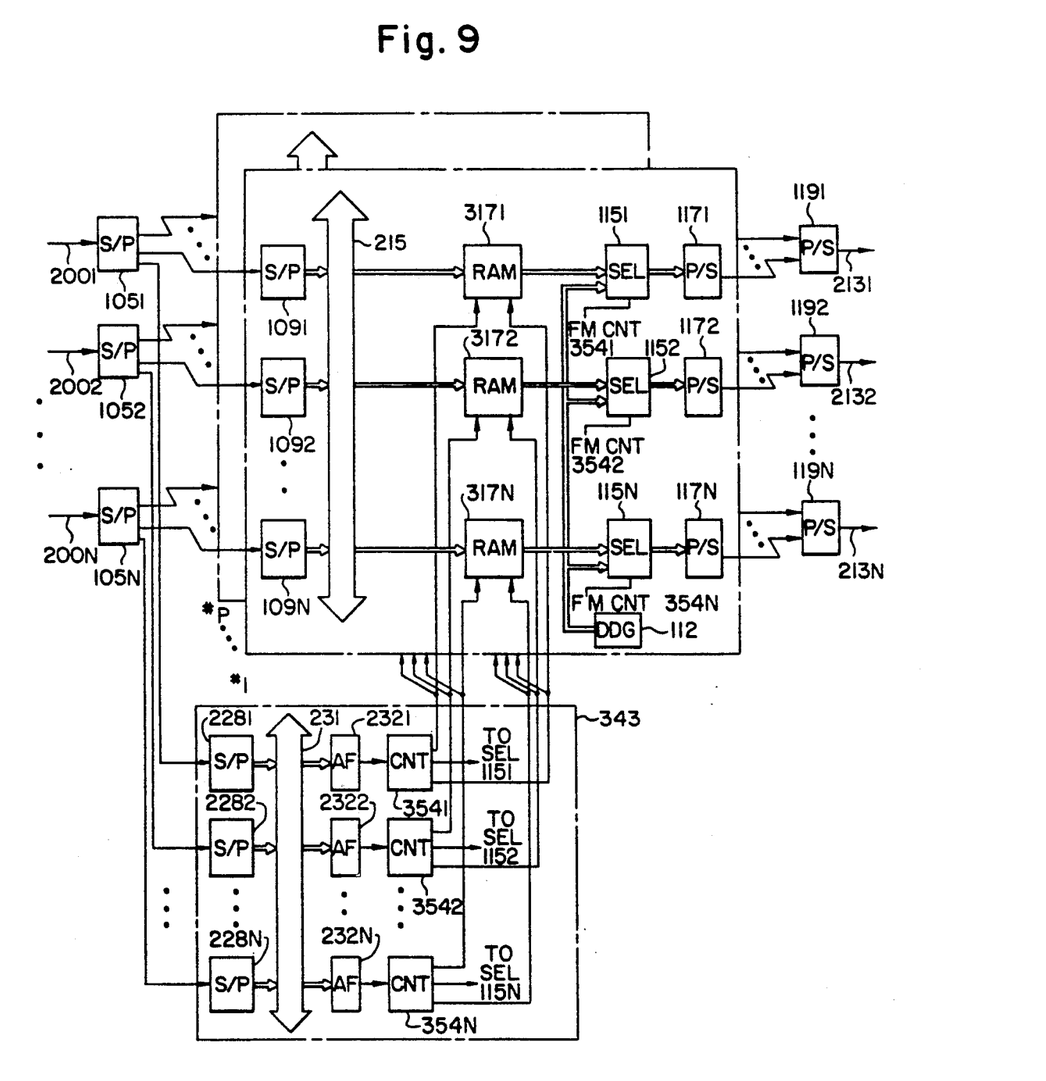
FIG. 9 is a schematic block diagram showing a second modification of the FIG. 6 construction.

As shown in FIG. 9, the buffer memories may be implemented by random access memories (RAM's) in place of the FiFo's shown in FIG. 8. A FiFo may be regarded as being fabricated by adding write and read address pointers to a RAM as described in Reference 2. On the other hand, each unit switch performs bit-slice processing so that the FiFo's assigned to the same channel write and read data out of the same address throughout the unit switches. To further simplify the unit switch configuration, therefore, the read and write address pointers may be collectively built in the address controller 238 of FIG. 8.

In FIG. 9, RAM controllers 3541 to 354N and the address filters 2321 to 232N are provided in an address controller 343 and assigned to the individual output lines.

Each of the RAM controllers has a similar structure to the address controller 124 shown in FIG. 3. When the RAM controller 3541, for example, receives a write enable signal from an address filter 2321, it delivers to its associated RAM 3171 the value of a write address pointer as a write address and a write enable signal and then increments the value of the write address pointer. In response to the write enable signal and the write address, data on the data bus 215 are written in the RAM 3171. More specifically, in response to a read clock pulse fed from a read clock source, not shown, the RAM controller 3451, for example, compares the values of its read and write address pointers. If the values are different from each other, the RAM controller 3451 delivers the value of the read address pointer as a read address and a read enable signal to the RAM and then increments the read address pointer. In response to the read address and the read enable signal, the data at the read address are read out from each RAM of each unit switch. Meanwhile, when the read and the write addresses are the same, the RAM controller supplies a selecting signal to the associated selector and the read enable signal to the associated RAM. The operations of the selectors 1151 to 115N, P/S converters 1171 to 117N, dummy data generator 112 and second P/S converters 1191 to 119N are the same as the packet switch of FIG. 8.

Figure 10:
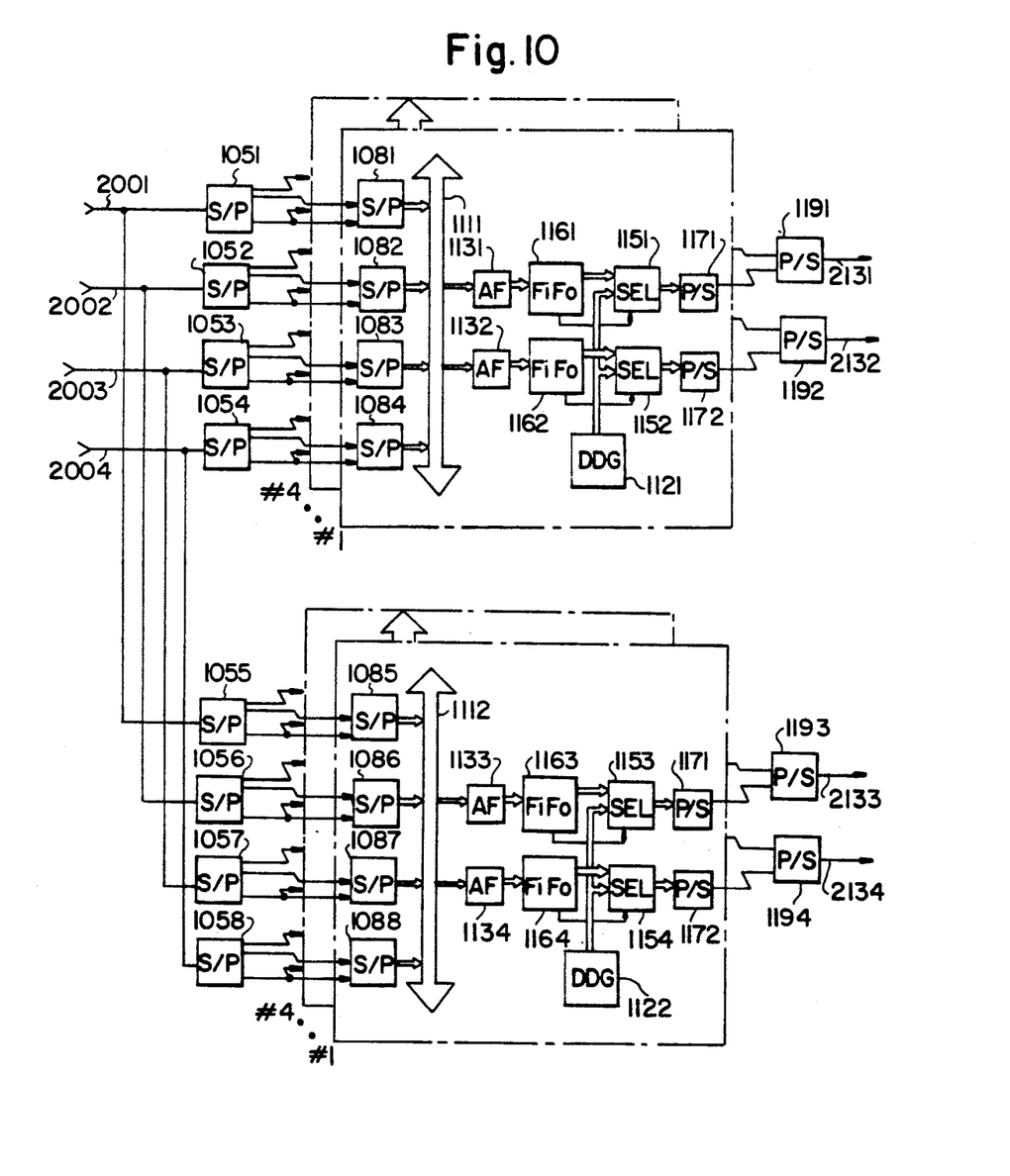
FIG. 10 is a schematic block diagram showing a third modification of the FIG. 6 construction.

Referring to FIG. 10, a specific implementation for eliminating the need for a large number of gates in an LSI configuration is shown. Specifically, when the packet switch shown in any of FIGS. 6, 8 and 9 is fabricated in an LSI configuration, the number of input and output lines available is dependent upon the number of gates which may be integrated in a single LSI. On the other hand, in the above construction, a majority of the LSI gates is assigned to the address filters and FiFo's of the output side so that an increase in the number of output lines would make it difficult to confine the bus in an LSI. In the light of this, the construction shown in FIG. 10 distributes the circuits associated with those output lines which consume a relatively large number of gates. This allows the number of output lines to be increased while accommodating the bus in an LSI.

In FIG. 10, a packet switch having four input lines and four output lines is shown by way of example. More specifically, a 4-input lines and 4-output lines packet switch is constituted by dividing the output lines, i.e., by two packet switches each having four input lines and two output lines. While the unit switches, the S/P converters and the P/S converters shown in FIG. 10 individually operate in the same manner as the packet switch of FIG. 6, it will be apparent that the configuration of FIG. 10 is applicable to any of the embodiments shown in FIGS. 8 and 9.

Various modifications will become possible for those skilled in the art after receiving the teachings of the present disclosure without departing from the scope thereof.

What is claimed is:

1. A packet switch, having a plurality of input lines and a plurality of output lines for exchanging packets received over said input lines and delivering exchanged packets to said output lines, comprising:
   (a) a plurality of first serial-to-parallel converting means each being associated with a respective one of said input lines for converting a packet coming in over an associated one of said input lines to first parallel data having a first predetermined number of bits, while latching address information contained in said packet;
   (b) a plurality of unit packet exchanging means equal in number to said first predetermined number, each comprising
      (i) a plurality of second serial-to-parallel converting means each being associated with one of said plurality of first serial-to-parallel converting means for receiving an associated bit of said first parallel data as input serial data, for converting said input serial data into second parallel data having a second predetermined number of bits,
      (ii) a plurality of memory means each being associated with one of said output lines for storing said second parallel data, in response to a write signal, as stored data and for outputting said stored data at a predetermined period,
      (iii) first bus means for distributing said second parallel data to said plurality of memory means, and
      (iv) a plurality of first parallel-to-serial converting means each being associated with one of said plurality of memory means for converting said second parallel data to first serial data and outputting said first serial data as an associated bit of said first parallel data; and
   (c) address controller means comprising
      (i) a plurality of third serial-to-parallel converting means each being associated with one of said first serial-to-parallel converting means for converting said address information to parallel address data,
      (ii) a plurality of address filter means each being associated with one of said plurality of output lines for making a determination whether or not said parallel address data indicates said one of said output lines and, if the result of said determination is positive, outputting said write signals, and
      (iii) second bus means for distributing said parallel address data to said plurality address filter means; and
   (d) a plurality of second parallel-to-serial converting means being associated with respective ones of said plurality of output lines for reading said first serial data from said first parallel-to-serial converting means of said plurality of unit packet exchanging means for converting said first serial data to second serial data and delivering said second serial data as said exchanged packet.

2. A packet switch having a plurality of input lines and a plurality of output lines, for exchanging packets received over said input lines and delivering exchanged packets to said output lines, comprising:
   a plurality of first serial-to-parallel converting means each being associated with a respective one of said input lines for converting a packet coming in over an associated one of said input lines to first parallel data having a predetermined number of bits, while latching address information contained in said packet;
   a plurality of unit packet exchange means each being associated with a respective one of said bits of said first parallel data; and
   a plurality of first parallel-to-serial converting means being associated with a respective one of said plurality of output lines for reading said first parallel data out of an associated one of said memory means, converting said first parallel data to first serial data as an exchanged packet to an associated one of said output lines;
   each of said plurality of unit packet exchange means comprising,
      a plurality of second serial-to-parallel converting means each being associated with said plurality of first serial-to-parallel converting means for receiving associated bits of said first parallel data as input serial data, converting said input serial data into second parallel data having a second predetermined number of bits, combining said address information being latched by an associated one of said first serial-to-parallel converting means with said second parallel data to produce third parallel data;
      a plurality of address filter means each being associated with said plurality of output lines for determining whether or not said third parallel data is meant for said associated output line by referencing address information of said third parallel data and, if a result of a decision is positive, outputting said second parallel data by removing said address information from said third parallel data;

bus means for distributing said third parallel data from one of said second serial-to-parallel converting means to all of said address filter means;

memory means each being associated with said address filter means for holding as write data said second parallel data which is outputted by an associated one of said address filter means and outputting said write data at a predetermined period; and a plurality of second parallel-to-serial converting means each being associated with said memory means for converting said second parallel data outputted by an associated one of said memory means to second serial data and outputting said second serial data.

* * * * *